US012360922B2

(12) United States Patent
Sasahara

(10) Patent No.: US 12,360,922 B2
(45) Date of Patent: Jul. 15, 2025

(54) INFORMATION PROCESSING APPARATUS CAPABLE OF BEING QUICKLY STARTED, CONTROL METHOD THEREFOR, AND STORAGE MEDIUM

(71) Applicant: CANON KABUSHIKI KAISHA, Tokyo (JP)

(72) Inventor: Naoto Sasahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 18/145,173

(22) Filed: Dec. 22, 2022

(65) Prior Publication Data

US 2023/0229604 A1 Jul. 20, 2023

(30) Foreign Application Priority Data

Jan. 14, 2022 (JP) .................. 2022-004477

(51) Int. Cl.
*G06F 13/12* (2006.01)
*G06F 13/42* (2006.01)

(52) U.S. Cl.
CPC ........ *G06F 13/122* (2013.01); *G06F 13/4282* (2013.01); *G06F 2213/0042* (2013.01)

(58) Field of Classification Search
CPC ............... G06F 13/122; G06F 13/4282; G06F 2213/0042

See application file for complete search history.

(56) References Cited

U.S. PATENT DOCUMENTS

| | | | | |
|---|---|---|---|---|
| 6,351,809 B1* | 2/2002 | St. Pierre, Jr. | ...... | G06F 13/4068 710/10 |
| 8,713,209 B2* | 4/2014 | Harris | ................... | G06F 9/4413 710/5 |
| 9,720,700 B1* | 8/2017 | Brown | ................... | G06F 21/31 |
| 2007/0030495 A1 | 2/2007 | Ohishi | | |
| 2007/0250691 A1* | 10/2007 | Cool | .................... | G06F 9/4403 713/1 |
| 2019/0227609 A1* | 7/2019 | Koshigaya | .............. | G06F 1/266 |

FOREIGN PATENT DOCUMENTS

JP 4861765 B2 1/2012

* cited by examiner

*Primary Examiner* — Eric T Oberly
(74) *Attorney, Agent, or Firm* — ROSSI, KIMMS & McDOWELL LLP

(57) ABSTRACT

An information processing apparatus which is capable of being quickly started. In the information processing apparatus, a USB device is capable of being removably connected to a downstream port. In the information processing apparatus, at startup of the information processing apparatus, a setting process for making the USB device ready for use is started in a connecting state in which the USB device is connected to the downstream port, and when the setting process has been completed, whether or not the USB device is in the connecting state is detected.

18 Claims, 9 Drawing Sheets

*FIG. 2B*

| ADDRESS VALUE | SETTING NAME | OUTLINE |
|---|---|---|
| 00h | VIDL | LOW-ORDER BITS OF VENDER ID |
| 01h | VIDH | HIGH-ORDER BITS OF VENDER ID |
| 02h | PIDL | LOW-ORDER BITS OF PRODUCT ID |
| 03h | PIDH | HIGH-ORDER BITS OF PRODUCT ID |
| 04h | ELECTRICAL | SETTING OF ELECTRICAL AMPLITUDE |
| 05h | CONFIG | SETTING OF OPERATING STATE, ETC. |

INFORMATION PROCESSING APPARATUS CAPABLE OF BEING QUICKLY STARTED, CONTROL METHOD THEREFOR, AND STORAGE MEDIUM

BACKGROUND OF THE INVENTION

Field of the Invention

The present invention relates to an information processing apparatus capable of being quickly started, a control method therefor, and a storage medium.

Description of the Related Art

A host computer equipped with an I/F (interface) for USB (Universal Serial Bus) is known. A USB device such as a USB storage, a USB card reader, or a USB keyboard is removably connected to the host computer, and the USB device can be used in the connecting state. The host computer may have a USB-HUB incorporated therein so that additional USB ports can be installed. In this case, a plurality of USB device can be connected to the host computer. Japanese U.S. Pat. No. 4,861,765 discloses a technique in which when a connection of a USB device is detected, notification is provided to a program, which uses the USB device, according to identification information on the USB device.

There is a conventional host computer in which the host computer is started with a USB device connected thereto, an amplitude setting process in a USB-I/F and an initialization process for a network are carried out for making the USB device ready for use. Depending on the times at which the amplitude setting process and the initialization process are carried out, the initialization process and the amplitude setting process are carried out in this order, and due to restarting subsequent to that, the initialization process has to be carried out. This presents a problem because the initialization process is carried out twice, and accordingly, the time required to start the host computer increases.

SUMMARY OF THE INVENTION

The present invention provides an information processing apparatus capable of being quickly started, a control method therefor, and a storage medium.

Accordingly, the present invention provides an information processing apparatus in which a USB device is capable of being removably connected to a downstream port, the information processing apparatus comprising one or more controllers configured to function as: a setting process unit configured to, at startup of the information processing apparatus, start a setting process for making the USB device ready for use in a connecting state in which the USB device is connected to the downstream port; a determination unit configured to determine whether or not the setting process has been completed; and a detection unit configured to, when the determination unit determines that the setting process has been completed, detect whether or not the USB device is in the connecting state.

According to the present invention, the information processing apparatus can be quickly started.

Further features of the present invention will become apparent from the following description of exemplary embodiments (with reference to the attached drawings).

BRIEF DESCRIPTION OF THE DRAWINGS

FIG. 2B is a view showing a table in which an example of a register for making settings related to the operating state of a USB-HUB is described.

DESCRIPTION OF THE EMBODIMENTS

The present invention will now be described in detail below with reference to the accompanying drawings showing embodiments thereof. Arrangements of the embodiments described below, however, are examples for illustrative purposes only, and the scope of claims is not limited to the arrangements of the embodiments.

Figure 1:
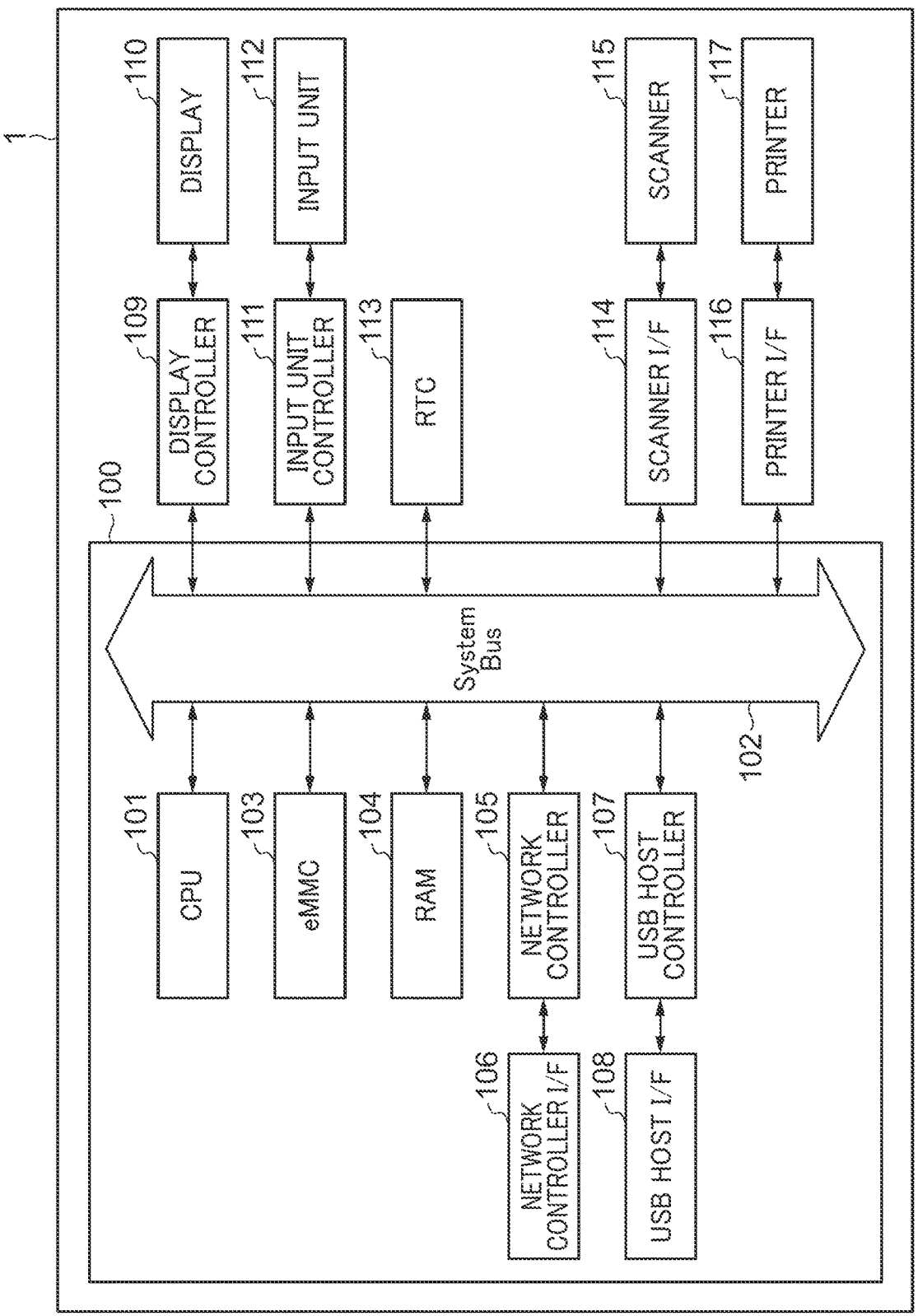
FIG. 1 is a block diagram showing a hardware configuration of an image forming apparatus according to a first embodiment.

Refereeing to FIG. 1 to FIG. 7, a description will now be given of a first embodiment. FIG. 1 is a block diagram showing a hardware configuration of an image forming apparatus 1 according to the first embodiment. As shown in FIG. 1, the image forming apparatus 1 has an information processing apparatus (control apparatus) 100 incorporated therein. The information processing apparatus 100 has a CPU 101, a system bus 102, an eMMC (Embedded Multi Media Card) 103, and a RAM (Random Access Memory) 104. The information processing apparatus 100 also has a network controller 105, a network controller I/F 106, a USB host controller 107, and a USB host I/F 108.

The CPU 101 is a central processing unit that operates software for running the image forming apparatus 1. The system bus 102 functions as a path for the CPU 101 to access the other units and for the other units to access one another. The eMMC 103 stores, for example, software for the image forming apparatus 1, databases, programs, temporarily-saved files, and so forth required for operation of the image forming apparatus 1. Note that the programs include a program for causing the CPU 101, which is a computer, to operate each component and each means (unit) of the information processing apparatus 100 (a control method for an information processing apparatus). The information processing apparatus 100 (the image forming apparatus 1) may use a large-capacity nonvolatile memory such as an HDD or an SSD in place of the eMMC 103. Programs for the image forming apparatus 1 are loaded into the RAM 104, and the RAM 104 acts as a data storage area in which variables for use in operation of the programs and data transferred from each unit via DMA (Direct Memory Access) are stored. The network controller 105 and the network controller I/F 106 enable communication between the image forming apparatus 1 and another device on a network. The USB host controller 107 and the USB host I/F 108 control communication between the image forming apparatus 1 and a USB device. The USB host I/F 108 is connected to a USB device via a USB cable or directly connected to a USB device without using a USB cable. Note that although in the configuration illustrated in FIG. 1, only one USB host I/F 108 is installed, the present invention is not limited to this, and a plurality of USB host I/Fs 108 is preferably installed.

As shown in FIG. 1, the image forming apparatus 1 has a display controller 109, a display 110, an input unit controller 111, an input unit 112, and an RTC (Real-Time Clock) 113. The image forming apparatus 1 also has a scanner I/F 114, a scanner 115, a printer I/F 116, and a printer 117.

The display 110 displays the operating status of the image forming apparatus 1 and others. This enables a user who uses the image forming apparatus 1 to see the operating status of the image forming apparatus 1 and others. The display controller 109 controls display on the display 110. The input unit 112 is, for example, a keyboard including a numeric keypad and a cursor key, a mouse, a touch panel, or the like, and is capable of receiving instructions given to the image forming apparatus 1 by the user. When, for example, the input unit 112 is a touch panel, the touch panel is mounted on the display 110 such that it overlays a surface of the display 110. The input unit controller 111 controls the input unit 112. The RTC 113 has a clock function, an alarm function, a timer function, etc. for the image forming apparatus 1. The scanner 115 is connected to the system bus 102 via the scanner I/F 114. Thus, the scanner 115 is able to perform scanning-in operation according to an instruction from the information processing apparatus 100. The printer 117 is connected to the system bus 102 via the printer I/F 116. Thus, the printer 117 is able to perform printing operation according to an instruction from the information processing apparatus 100.

Figure 2A:
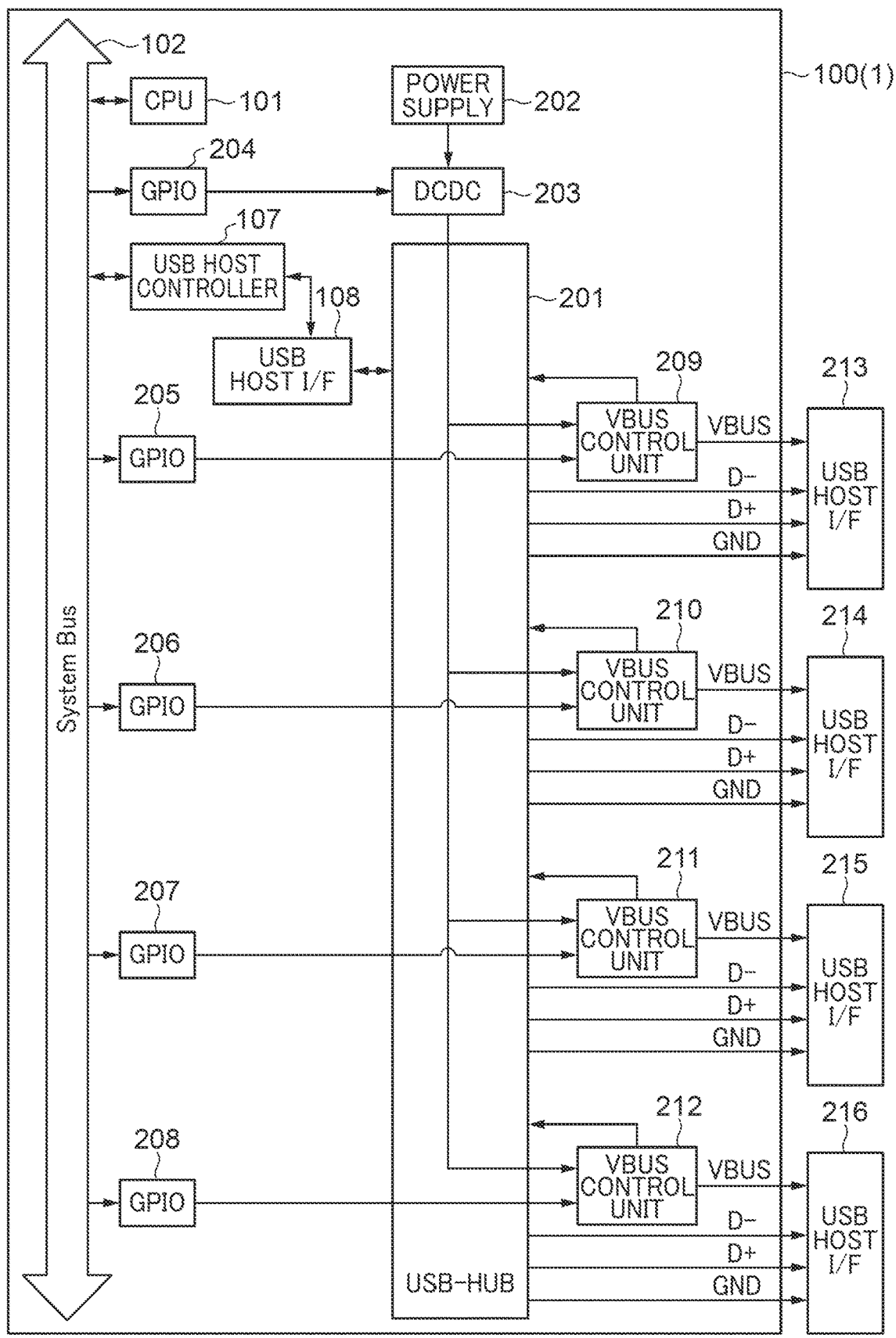
FIG. 2A is a circuit configuration diagram showing a configuration of USB host I/Fs installed in an image processing apparatus (the image forming apparatus) in FIG. 1 and a configuration that is capable of controlling VBUSes for the USB host I/Fs (namely, capable of controlling turning-on/off of VBUS signals).

FIG. 2A is a circuit configuration diagram showing a configuration of USB host I/Fs 213 to 216 installed in the image processing apparatus 100 (the image forming apparatus 1) in FIG. 1 and a configuration that is capable of controlling VBUSes for the USB host I/Fs 213 to 216 (namely, capable of controlling turning-on/off of VBUS signals). As shown in FIG. 2A, the information processing apparatus 100 has a USB-HUB 201, a power supply 202, a DC-DC 203, GPIOs (General-Purpose Input/Output) 204 to 208. The information processing apparatus 100 (USB-HUB 201) has VBUS control units 209 to 212 and USB host I/Fs 213 to 216, which are downstream ports.

The USB-HUB 201 is connected to the USB host controller 107 via the USB host I/Fs 108. A USB device (not illustrated, the same will apply below) can be removably connected to each of the USB host I/Fs 213 to 216. The USB device is not particularly limited, and examples of the USB device include a USB storage, a USB card reader, and a USB keyboard. The USB-HUB 201 has a function of relaying communication between the USB host controller 107 and the USB devices connected to the respective USB host I/Fs 213 to 216. In a connecting state, which is a state where the USB devices are connected to the USB host I/Fs 213 to 216, the CPU 101 is able to obtain information on the USB devices from the USB devices via the USB host controller 107. The information on the USB devices includes "Vender ID", "Product ID", and "Class ID". Based on the information, the CPU 101 assigns appropriate device drivers to the respective USB devices and performs control relating to the USB devices. The device drivers used by the image forming apparatus 1 include an HID driver, a storage driver, a WLAN driver, a universal drier, a HUB driver, and an Ethernet driver.

Power supplied to the VBUSes for the USB host I/Fs 213 to 216 is generated from the power from the power supply 202 via the DC-DC 203. That is, in the information processing apparatus 100, the power supply 202 and the DC-DC 203 function as power feeding means for feeding power to the USB host I/Fs 213 to 216. The power generated by the DC-DC 203 is input to the VBUS control unit 209, and is input to the USB host I/F 213 after a logical product is obtained using an output from the GPIO 205 and an AND circuit. Likewise, the power generated by the DC-DC 203 is input to the VBUS control unit 210, and is input to the USB host I/F 214 after a logical product is obtained using an output from the GPIO 206 and an AND circuit. The power generated by the DC-DC 203 is input to the VBUS control unit 211, and is input to the USB host I/F 215 after a logical product is obtained using an output from the GPIO 207 and an AND circuit. The power generated by the DC-DC 203 is input to the VBUS control unit 212, and is input to the USB host I/F 216 after a logical product is obtained using an output from the GPIO 208 and an AND circuit. With this configuration, the CPU 101 is able to control the GPIOs 205 to 208 to turn on/off the VBUS power supplied to the USB host I/Fs 213 to 216 respectively. Moreover, by controlling the GPIO 204, the CPU 101 is able to switch the operating modes of the DC-DC 203.

Note that in the configuration illustrated in FIG. 2, the USB host I/Fs 213 to 216 are connected to the USB host controller 107 via the USB-HUB 201 and the USB host I/F 108; however, the present invention is not limited to this. For example, the USB host I/Fs 213 to 216 may be directly connected to the USB host controller 107. Further note, a main power supply for the image forming apparatus 1 is provided separately from the power supply 202; however, it is omitted from the configuration illustrated in FIG. 2A.

There is the USB-HUB 201 having a configuration capable of setting its own operating state. FIG. 2B is a view showing a table in which an example of a register for making settings related to the operating state of the USB-HUB 201 is described. In the present embodiment, 8 bits are allocated to one address. Addresses 00h to 03h are areas for setting "Vender ID" and "Product ID" of the USB-HUB 201. An address 04h is an area for setting an electrical amplitude (amplitude setting) for the USB host I/Fs 213 to 216, which are the downstream ports. In the address 04h, low-order 4 bits are used to adjust the slew rate of each downstream port, and high-order 4 bits are used to control the level of data J and data K for each downstream port. Each bit corresponds to each downstream port, and when the value thereof is "0", the downstream port operates in a normal state, and when the value thereof is "1", the downstream port operates with the output of power increased. The adjustment of the slew rate is required when the quality of an output signal cannot satisfy a USB specified value. An example of the reason for not being able to satisfy the USB specified value is that the amplitude or slew rate decreases due to an increase in impedance caused by a circuit configuration inside the information processing apparatus 100, a USB cable length, an anti-noise product, or the like. An address 05h is used to make other settings. For example, the address 05h is used to switch between a power-saving mode and a test mode and also used to selectively able/disable each downstream port.

To make settings on the operating state of the USB-HUB 201, setting values are read into RAM in the USB-HUB 201 from the register at startup of the USB-HUB 201. Then, the USB-HUB 201 starts operating in a mode according to the setting values. Note that the setting values stored in the register are initialized when the power to the USB-HUB 201 is completely turned off. To enable the settings, it is necessary to send the setting values to the USB-HUB 201 using a vendor request of the USB-HUB 201 and then restart the USB-HUB 201 in terms of software using the vendor request of the USB-HUB 201 again.

Figure 3:
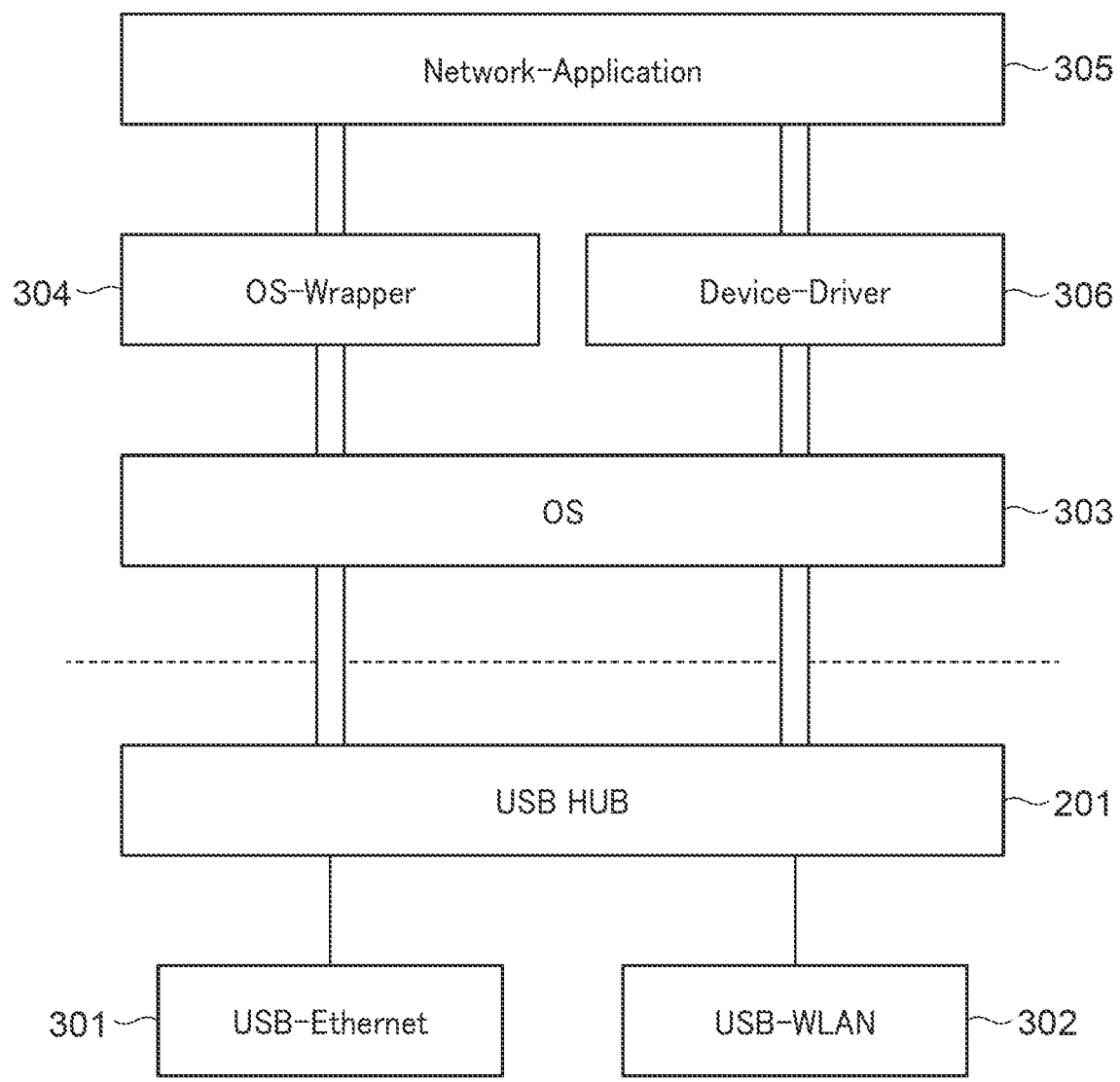
FIG. 3 is a block diagram showing the relationship between USB devices (examples), which are connected to the image forming apparatus, and applications that use the USB devices.

FIG. 3 is a block diagram showing the relationship between USB devices (examples), which are connected to the image forming apparatus, and applications that use the USB devices. An OS 303, an OS-Wrapper 304, a Network-Application 305, and a Device-Driver 306 in FIG. 3 are software modules, which are executed by the CPU 101. A USB-Ethernet 301 is a USB device that enables wired LAN connection via USB. A USB-WRAN 302 is a USB device that enables wireless LAN connection via USB. The USB-Ethernet 301 and the USB-WLAN 302 are each connected to one of the USB host I/Fs 213 to 216, which are the downstream ports of the USB-HUB 201, so that they can be ready for use.

When each of the USB devices, the USB-Ethernet 301 and the USB-WLAN 302, is connected to the downstream port of the USB-HUB 201, the connection (connected state) is recognized by the OS 303 first. Next, the OS-Wrapper 304 monitors whether or not the OS 303 has recognized insertion/removal (connected state/unconnected state) of each USB device (whether or not each USB device has been inserted or removed). When determining that each USB device has been inserted or removed, the OS-Wrapper 304 notifies the Network-Application 305 of information indicating that matter. When receiving this notification from the OS-Wrapper 304, the Network-Application 305 carries out initialization processes for each USB device. The initialization processes include, for example, activation of the Device-Driver 306 for each USB device, transmission of firmware to each USB device, and establishment of an IP address for each USB device. Execution of these sequential initialization processes enable network communication (network connection) via each USB device.

Figure 4:
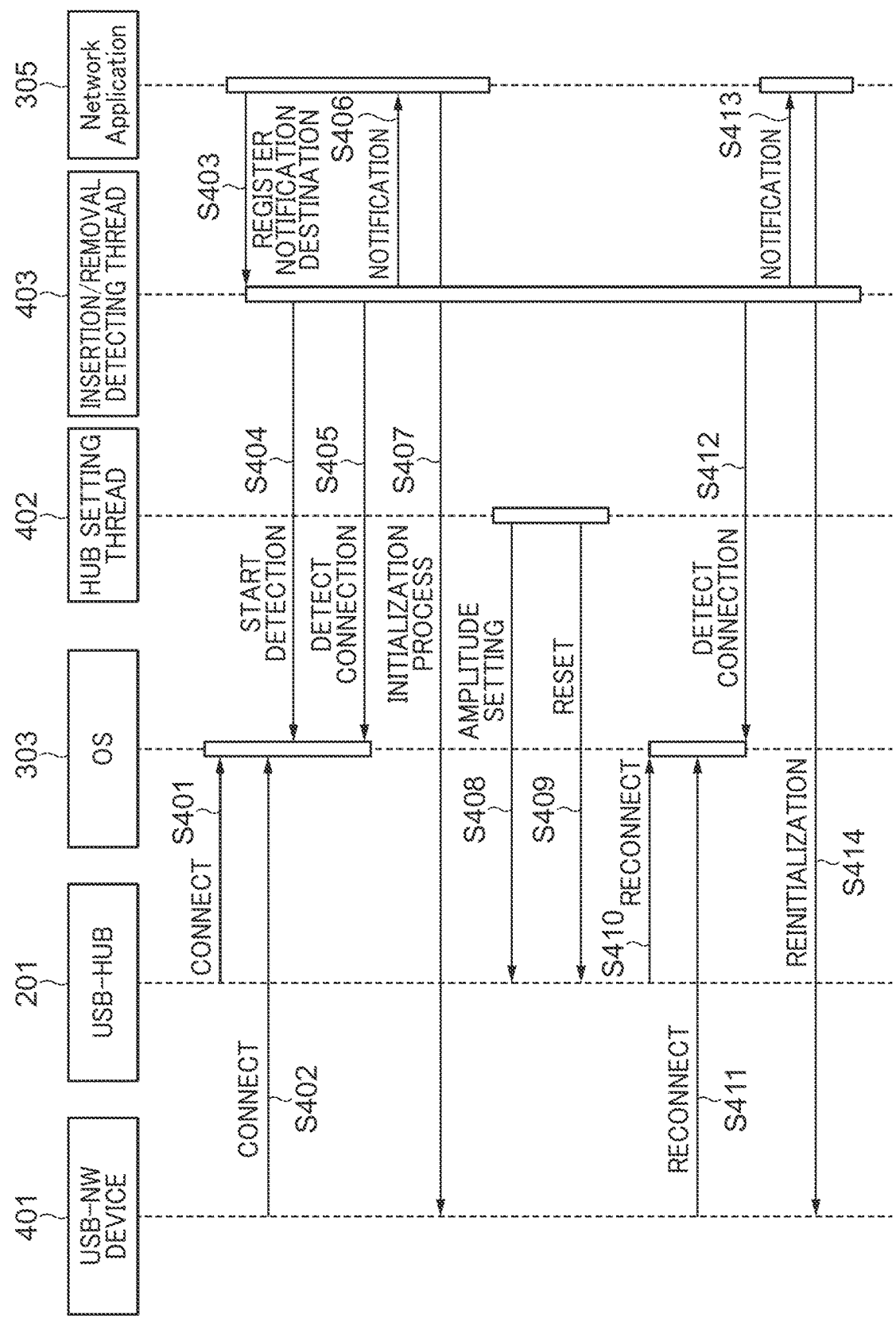
FIG. 4 is a diagram showing the sequence of processes that are carried out at startup of the image forming apparatus, which causes a problem.

FIG. 4 is a diagram showing the sequence of processes that are carried out at startup of the image forming apparatus 1, which causes a problem (a problem to be solved by the present invention). Referring to FIG. 4, a description will be given of the problem to be solved by the present invention. In the sequence illustrated in FIG. 4, a USB-NW device (USB network device) 401 corresponds to ether one of the USB devices i.e., the USB-Ethernet 301 and the USB-WLAN 302. This sequence is based on the assumption that the image forming apparatus 1 has been started in a state where the USB-NW device 401 is connected to one of the USB host I/Fs 213 to 216 (hereafter referred to as "the device connecting state" or referred to simply as "the connecting state"). A HUB setting thread 402 and an insertion/removal detecting thread 403 are programs (software modules) corresponding to the OS-Wrapper 304. The HUB setting thread 402 and the insertion/removal detecting thread 403 are asynchronously executed.

In step S401, when the image forming apparatus 1 is started in the device connecting state, the OS 303 (the CPU 101) recognizes a connection between the OS 303 and the USB-HUB 201. Thus, in step S402, the OS 303 is able to recognize that the USB-NW device 401 is connected to one downstream port among the USB host I/Fs 213 to 216. Note that the connecting state of the USB-NW device 401 is ensured in a case where the OS 303 has normally started up.

In step S403, the insertion/removal detecting thread 403 receives a registration of a notification destination from the Network-Application 305 (that is, the Network-Application 305 registers a notification destination in the insertion/removal detecting thread 403). As a result, in step S404, the insertion/removal detecting thread 403 is able to cause the OS 303 to start detecting the connection of the USB-NW device 401. In step S405, when the connection of the USB-NW device 401 has been completed, the insertion/removal detecting thread 403 detects the completion of the connection. In step S406, the insertion/removal detecting thread 403 notifies the Network-Application 305 of information indicating that the connection has been completed.

In step S407, when receiving the notification from the insertion/removal detecting thread 403 in the step S406, the Network-Application 305 carries out an initialization process for making the USB-NW device 401 ready for use. By completing the initialization process, the IP address of the USB-NW device 401 is established to enable communication via the USB-NW device 401.

After the execution of the step S407, the amplitude setting is made by the HUB setting thread 402 (step S408), and the USB-HUB 201 is reset by the HUB setting thread 402 (step S409). In this case, the USB-HUB 201 is disconnected once and then connected again (step S410). Along with that, the USB-NW device 401 connected to the USB-HUB 201 is also disconnected once and then connected again (step S411).

In step S412, the insertion/removal detecting thread 403 causes the OS 303 to start detecting the connection of the USB-NW device 401. In step S413, the insertion/removal detecting thread 403 notifies the Network-Application 305 of information indicating that the connection has been completed.

In step S414, when receiving the notification from the insertion/removal detecting thread 403 in the step S413, the the Network-Application 305 carries out an initialization process for making the USB-NW device 401 ready for use. By completing the initialization process, an IP address of the USB-NW device 401 is established. The IP address established after the execution of the step S414 may be different from the IP address established after the execution of the step S407. Namely, the IP address of the USB-NW device 401, which has been established once, may be changed to a different IP address.

As described above, depending on the timing at which the amplitude setting (step S408) on the USB-HUB 201 is made, initialization of the USB-NW device 401 connected to the USB-HUB 201 needs to be executed twice. That is, in the sequence illustrated in FIG. 4, unnecessary (useless) initialization of the USB-NW device 401 is executed, and accordingly, the time required to start the image forming apparatus 1 increases. In the case where initialization is executed twice, the IP address of the USB-NW device 401 established in the second initialization may be different from the IP address of the USB-NW device 401 established in the first initialization. In this case, it is necessary to initialize and set up an application, which uses the USB-NW device 401, again. To initialize and set up the application again during a starting process for the image forming apparatus 1, the starting process that has progressed partway needs to be carried out from the beginning. In this case, the time required to start the image forming apparatus 1 further increases, which may cause other problems. Moreover, in a case where a server application that uses network communication is used, IP address information may be sent to a client so as to designate a destination. In this case, if the IP address of the USB-NW device 401 is changed by reinitialization, the new IP address after the change needs to be sent to the client to require the client to designate a destination again, and this may affect processing at the client, that is, may cause more hassles on the client.

Thus, the image forming apparatus 1 (the information processing apparatus 100) is configured to be able to solve the problem described above. A description will now be given of the construction and operation of the present invention.

Figure 5:
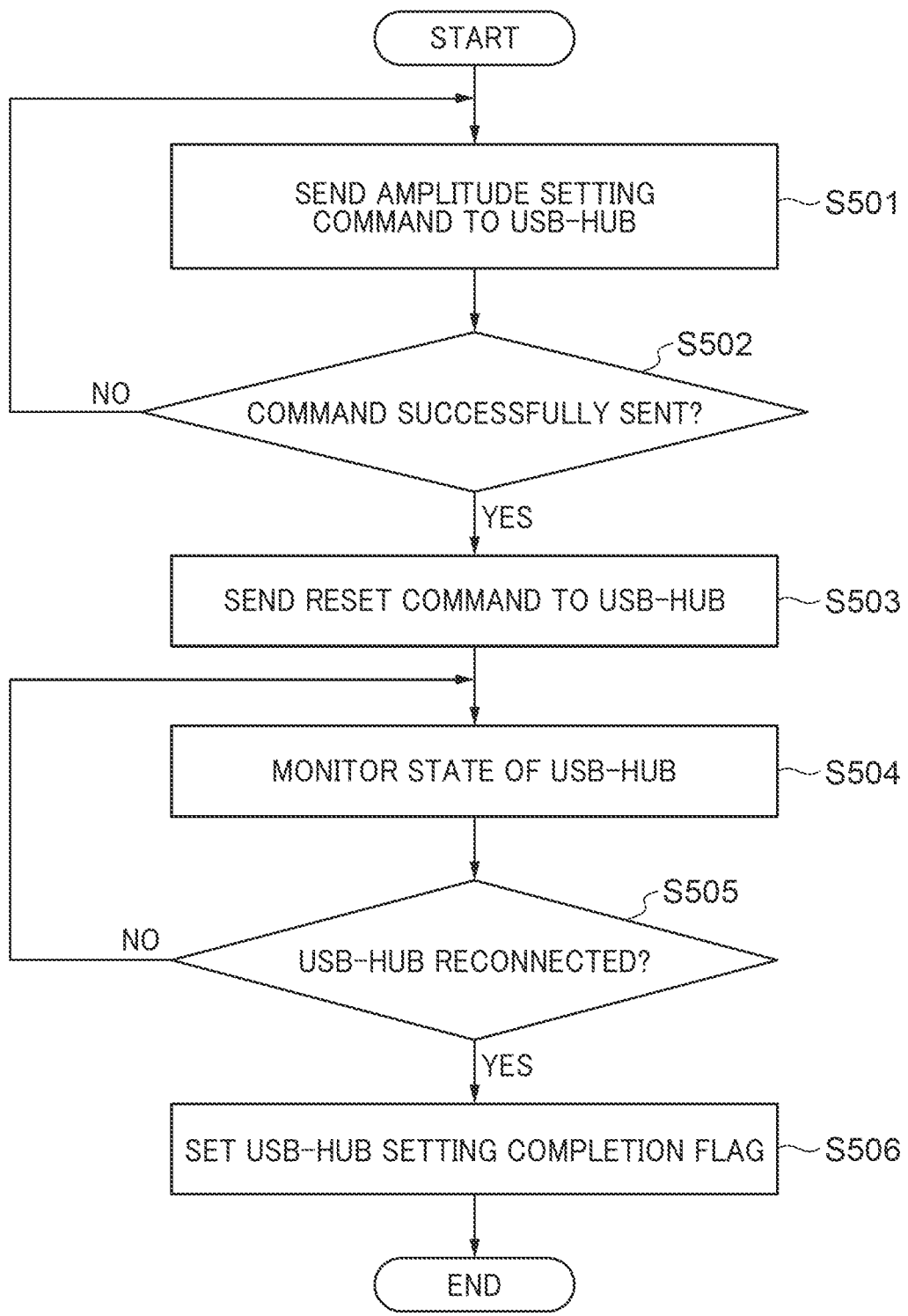
FIG. 5 is a flowchart of a process that is carried out using a HUB setting thread according to the first embodiment.
Figure 6:
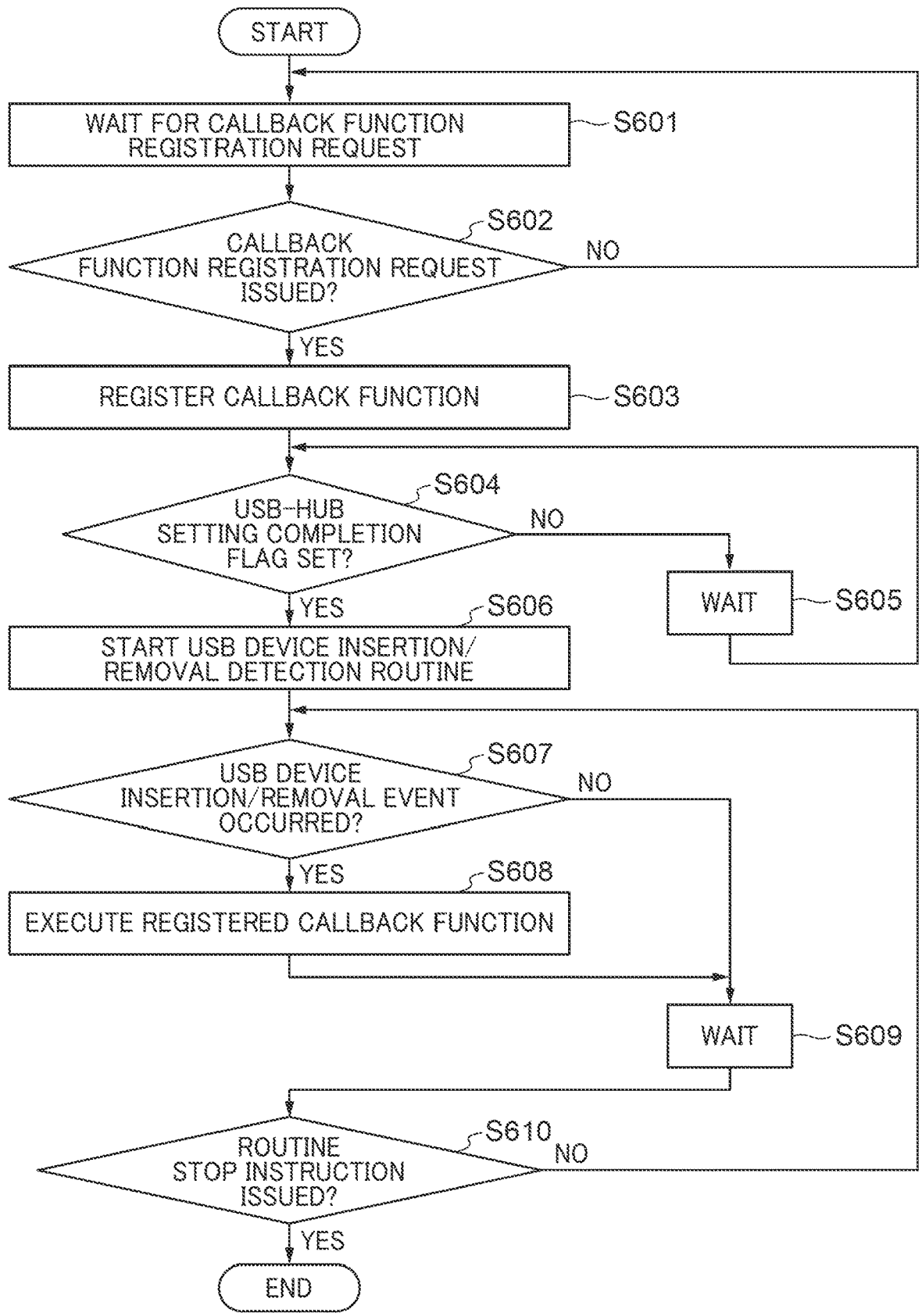
FIG. 6 is a flowchart of a process that is carried out using an insertion/removal detecting thread according to the first embodiment.

FIG. 5 and FIG. 6 are flowcharts of processes for solving the problem to be solved by the present invention. The CPU 101 carries out all the processes in the flowcharts. FIG. 5 is a flowchart of a process that is carried out using the HUB setting thread 402 according to the first embodiment. FIG. 6 is a flowchart of a process that is carried out using the insertion/removal detecting thread 403 according to the first embodiment.

As shown in FIG. 5, in step S501, at startup of the image forming apparatus 1, the HUB setting thread 402 (the CPU 101) sends an amplitude setting command to the USB-HUB 201.

In step S502, the HUB setting thread 402 determines whether or not the amplitude setting command has been successfully sent to the USB-HUB 201. When the HUB setting thread 402 determines in the step S502 that the amplitude setting command has been successfully sent to the USB-HUB 201 (Yes in the step S502), the process proceeds to step S503. On the other hand, when the HUB setting thread 402 determines in the step S502 that the amplitude setting command has not been successfully sent to the USB-HUB 201, that is, the transmission of the amplitude setting command is unsuccessful (No in the step S502), the process returns to the step S501, and the step S501 and the subsequent steps are sequentially executed.

In the step S503, the HUB setting thread 402 sends a reset command to the USB-HUB 201. Upon receiving the reset command, the USB-HUB 201 automatically restarts to start processing for reconnection. In step S504, the HUB setting thread 402 monitors the state of the USB-HUB 201 (whether or not the USB-HUB 201 is in the connecting state) until the USB-HUB 201 is reconnected to the OS 303.

In step S505, the HUB setting thread 402 determines whether or not the USB-HUB 201 has been reconnected to the OS 303. When the HUB setting thread 402 determines in the step S505 that the USB-HUB 201 has been reconnected to the OS 303 (Yes in the step S505), the process proceeds to step S506. On the other hand, when the HUB setting thread 402 determines in the step S505 that the USB-HUB 201 has not been reconnected to the OS 303 (No in the step S505), the process returns to the step S504, and the step S504 and the subsequent steps are sequentially executed.

In the step S506, the HUB setting thread 402 sets, in the RAM 104, a flag indicating that the settings on the USB-HUB 201 have been completed, and the present process is ended.

As shown in FIG. 6, in step S601, at the startup of the image forming apparatus 1, the insertion/removal detecting thread 403 (the CPU 101) waits for a Callback function registration request from the Network-Application 305.

In step S602, the insertion/removal detecting thread 403 determines whether or not the Callback function registration request has been issued. When the insertion/removal detecting thread 403 determines in the step S602 that the Callback function registration request has been issued (Yes in the step S602), the process proceeds to the step S603. On the other hand, when the insertion/removal detecting thread 403 determines in the step S602 that the Callback function registration request has not been issued (No in the step S602), the process returns to the step S601, and the step S601 and the subsequent steps are sequentially executed.

In the step S603, the insertion/removal detecting thread 403 registers the Callback function.

In step S604, the insertion/removal detecting thread 403 determines whether or not the flag indicating that the settings on the USB-HUB 201 have been completed (refer to the step S506) is set. When the insertion/removal detecting thread 403 determines in the step S604 that the flag is set (Yes in the step S604), the process proceeds to step S606. On the other hand, when the insertion/removal detecting thread 403 determines in the step S604 that the flag is not set (No in the step S604), the process proceeds to step S605.

In the step S605, the insertion/removal detecting thread 403 waits (stands by) for a predetermined time period.

In the step S606, the insertion/removal detecting thread 403 starts a process (routine) for detecting the insertion/removal of a USB device (for example, the USB-NW device 401). In the detection of the insertion/removal of a USB device, the insertion/removal detecting thread 403 loads a file, in which information on the USB device created by the OS 303 is described, at predetermined time intervals, and based on a difference between information loaded last time and the information loaded this time, determines whether or not the USB device has been inserted or removed.

In step S607, based on a result of the detection in the step S606, the insertion/removal detecting thread 403 determines whether or not the USB device has been inserted or removed (a USB device insertion/removal event has occurred). When the insertion/removal detecting thread 403 determines in the step S607 that the USB device insertion/removal event has occurred (Yes in the step S607), the process proceeds to step S608. On the other hand, when the insertion/removal detecting thread 403 determines in the step S607 that USB device insertion/removal event has not occurred (No in the step S607), the process proceeds to step S609.

In the step S608, the insertion/removal detecting thread 403 executes the Callback function that has already been registered. This notifies the Network-Application 305 that the USB device has been inserted or removed. After the step S608 is executed, the process proceeds to the step S609.

In the step S609, the insertion/removal detecting thread 403 waits for a predetermined time period.

After the step S609 is executed, the insertion/removal detecting thread 403 determines in step S610 whether or not an instruction to stop the insertion/removal detecting routine has been issued from an external device (for example, a personal computer). When the insertion/removal detecting thread 403 determines in the step S610 that the instruction to stop the insertion/removal detecting routine has been issued (Yes in the step S610), the present process is ended. On the other hand, when the insertion/removal detecting thread 403 determines in the step S610 that the instruction to stop the insertion/removal detecting routine has not been issued (No in the step S610), the process returns to the step S607, and the step S607 and the subsequent steps are sequentially executed.

Figure 7:
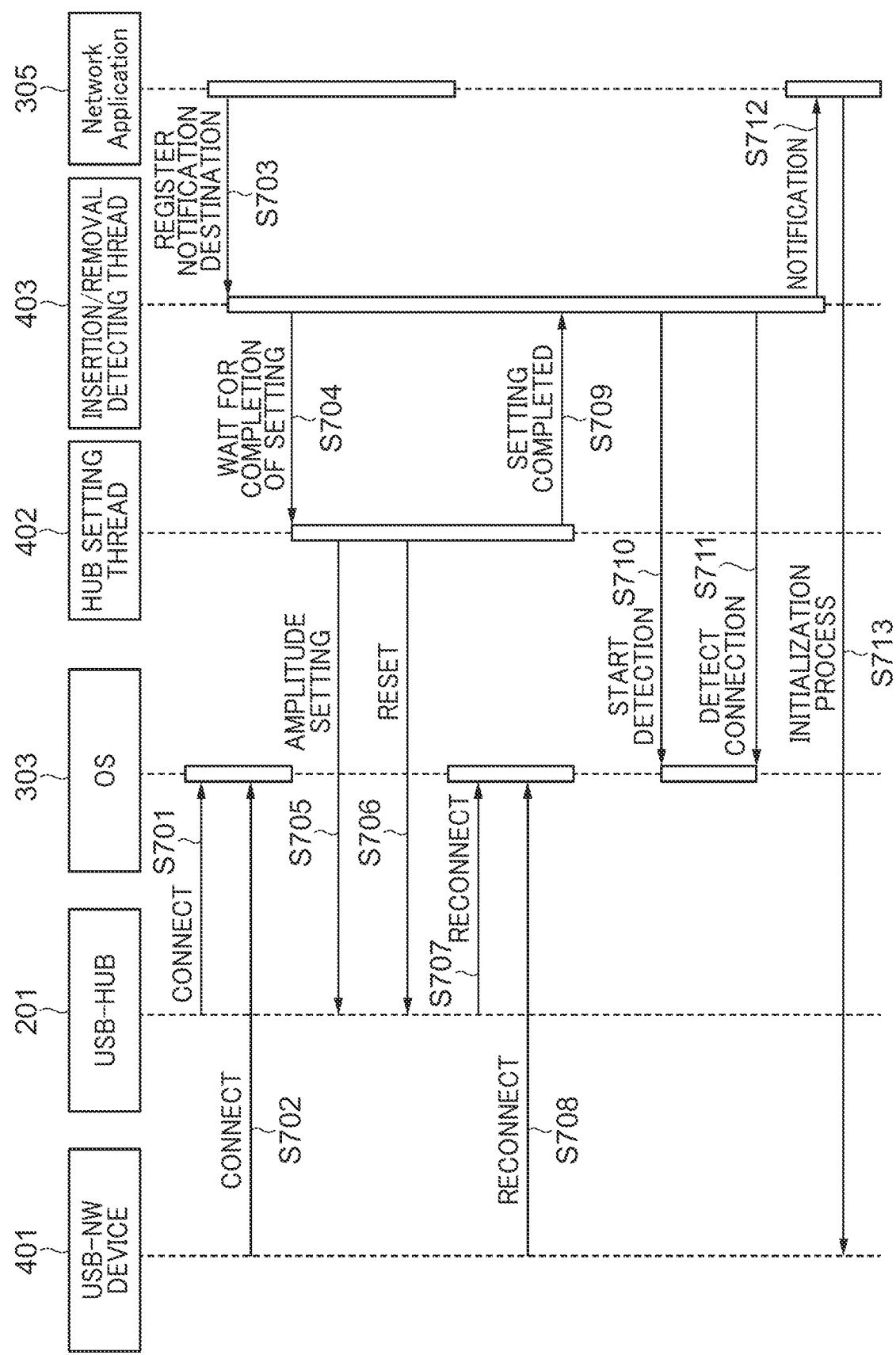
FIG. 7 is a diagram showing the sequence of processes that are carried out at startup of the image forming apparatus according to the first embodiment.

FIG. 7 is a diagram showing a sequence of processes for solving the problem to be solved by the present invention, and indicates that the problem is solved by the processes in FIGS. 5 and 6. FIG. 7 is a diagram showing the sequence of processes that are carried out at startup of the image forming apparatus 1 according to the first embodiment.

In step S701, when the image forming apparatus 1 is started in the device connecting state, the OS 303 recognizes a connection between the OS 303 and the USB-HUB 201. As a result, in step S702, the OS 303 is able to recognize that the USB-NW device 401 is connected to one downstream port among the USB host I/Fs 213 to 216.

In step S703, the insertion/removal detecting thread 403 receives a registration of a notification destination from the Network-Application 305. In step S704, the insertion/removal detecting thread 403 waits for settings on the USB-HUB 201 to be complete. Note that, the "settings on the USB-HUB 201" means settings for making the USB-NW device 401 ready for use (hereafter referred to as "the USB settings") in the device connecting state. The USB settings are made by the HUB setting thread 402 (the CPU 101). That is, in the present embodiment, the HUB setting thread 402 functions as a setting means for making the USB settings. The USB settings include an amplitude adjustment that adjusts the amplitude of a voltage output waveform at the downstream port to which the USB-NW device 401 is connected. The "amplitude adjustment" means an electrical property adjustment setting for improving to achieve quality compliant with a USB compliance test (for example, "the USB 2.0 compliance test"). The amplitude adjustment prepares for making the USB-NW device 401 ready for use.

After the step S704 is executed, the HUB setting thread 402 makes the amplitude setting on the USB-HUB 201 in step S705 and sends a reset command for the USB-HUB 201 to the USB-HUB 201 in step S706. In this case, the USB-HUB 201 is disconnected once and then connected again (step S707). Along with that, the USB-NW device 401 connected to the USB-HUB 201 is also disconnected once and then connected again (step S708).

After the step S708 is executed, in the step S709 (corresponding to the step S506 in FIG. 5), when the settings on the USB-HUB 201 are completed, the HUB setting thread 402 sets, in the RAM 104, a flag indicating that matter, i.e., a flag indicating that the USB settings have been completed. The insertion/removal detecting thread 403 determines, based on the flag, that the USB settings have been completed, and the waiting state that has continued since the step S704 is ended. That is, in the present embodiment, the insertion/removal detecting thread 403 functions as a determination means for determining, based on the flag indicating the completion of the the USB settings, whether or not the USB settings have been completed when the image forming apparatus 1 is started (determinations step). Note that when determining that the USB settings have not been completed, the insertion/removal detecting thread 403 keeps waiting until the USB settings are completed.

After the waiting state of the insertion/removal detecting thread 403 is ended in the step S709, that is, when the insertion/removal detecting thread 403 determines that the USB settings have been completed, the insertion/removal detecting thread 403 causes the OS 303 to start detecting a connection with the USB-NW device 401, in the step S710 (corresponding to the step S606 in FIG. 6). When the connection with the USB-NW device 401 has been completed, the insertion/removal detecting thread 403 detects in step S711 that the connection with the USB-NW device 401 has been completed (that is, the state in which the USB-NW device 401 is connected, or "the device connecting state"). That is, in the present embodiment, the insertion/removal detecting thread 403 also functions as a detection means for detecting whether or not the USB-NW device 401 is in the device connecting state (detection step), when the insertion/removal detecting thread 403 determines that the USB settings have been completed. Note that in the image forming apparatus 1, when the USB-NW device 401 is not connected to it, it is preferable to provide notification of a detection result obtained by the detection means without waiting for the determination that the USB settings have been completed. In this way, the notification can be provided as quickly as possible. After the step S711 is executed, in the step S712, the insertion/removal detecting thread 403 notifies the Network-Application 305 of information indicating that the connection has been completed.

In step S713, when receiving the notification from the insertion/removal detecting thread 403 in the step S712, the Network-Application 305 carries out the initialization process described above to make the USB-NW device 401 ready for use. That is, in the present embodiment, the Network-Application 305 function as an initialization means (initialization process means) for initializing the USB-NW device 401 (initialization process), when the device connecting state is detected. When the device connecting state is detected, The DC-DC 203 feeds power to the USB-NW device 401. Network communication via the USB-NW device 401 is enabled by the initialization process and feeding power being carried out.

As described above, in the sequence illustrated in FIG. 7, the number of initializations for the USB-NW device 401 is minimized, that is, initialization is required to be executed only once. As a result, as compared to the sequence illustrated in FIG. 4, an increase in the time required to start the image forming apparatus 1 can be prevented, and hence the image forming apparatus 1 can be quickly started. Moreover, since initialization is not executed twice or more, the IP address of the USB-NW device 401 can be prevented from being changed as described above. This makes it possible to prevent a necessity of re-initialization or re-set up of an application which uses the USB-NW device 401, and accordingly re-execution of a starting process. Further, since the IP address can be prevented from being changed, the client can be prevented from being affected which is described above, that is, the client can be prevented from hassles.

Note that when the image forming apparatus 1 goes to sleep mode, and the feeding of power to the USB-HUB 201 stops, it is necessary to make settings on the USB-HUB 201 again after wake-up from sleep mode. In this case, there is a concern that the time required to wake up from sleep mode may increase; however, by the control according to the present embodiment, the time required to wake up from sleep mode can be prevented from increasing, and hence the image forming apparatus 1 can be quickly started.

Figure 8:
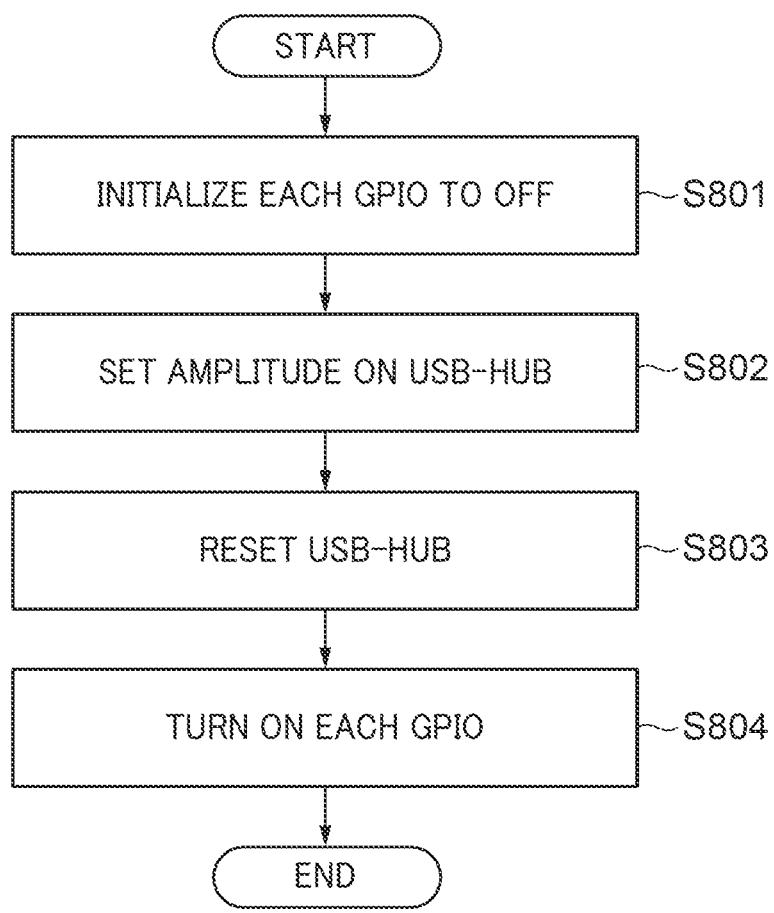
FIG. 8 is a flowchart of a process that is carried out at startup of an image forming apparatus according to a second embodiment.

Referring to FIG. 8, a description will now be given of a second embodiment. FIG. 8 is a flowchart of a process for solving the problem to be solved by the present invention. In the present embodiment, the problem can be solved by controlling VBUSes for the downstream ports of the USB-HUB 201, as distinct from the first embodiment. The main hardware configuration and the main software configuration of the image forming apparatus 1 are the same as those in the first embodiment, and thus will not be described in the description of the present embodiment.

In step S801, at startup of the image forming apparatus 1, the CPU 101 initializes to turn all of the GPIOs 205 to 208 to an initial value, that is, to turn them off. By this initialization, the supply of VBUSes to the USB host I/Fs 213 to 216, which are the downstream ports, is regulated, that is, stopped. As a result, devices other than the USB-HUB 201 can be prevented from going to the connecting state even after the OS 303 recognizes the USB-HUB 201.

After the execution of the S801, an amplitude setting on the USB HUB 201 (step S802) and reset of the USB-HUB 201 (step S803) are executed sequentially. When the settings on the USB-HUB 201 are complete, in the step S804, the CPU 101 turns on all of the GPIOs 205 to 208 so as to provide VBUSes to the downstream ports. At this time, the USB-NW device 401 is connected to the USB-HUB 201 for the first time such that they are able to communicate with each other. As a result, the initialization process for the USB-NW device 401 is required to be executed only once.

As described above, in the present embodiment, the image forming apparatus 1 is configured to stop feeding power to the downstream port at startup, and to feed power to the downstream port when it is determined that the settings on the USB-HUB 201 have been completed. As a result, the number of initialization processes can be decreased to one, and hence the image forming apparatus 1 can be quickly started. Moreover, at a timing when the USB-HUB 201 is reset, the turning-off/on of VBUS to a USB device connected to the downstream port does not occur. As a result, the number of times of turning-off/on of the power to a USB device connected to the downstream port can be decreased, and the speed at which the life expectancy of the USB device is shortened can be reduced, so that the USB device can be used for a long time period.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-004477, filed Jan. 14, 2022, which is hereby incorporated by reference wherein in its entirety.

What is claimed is:

1. An information processing apparatus in which a USB device is capable of being removably connected to a downstream port, the information processing apparatus comprising:
   one or more controllers configured to function as:
   a setting process unit configured to, at startup of the information processing apparatus, start a setting process for making the USB device ready for use in a connecting state in which the USB device is connected to the downstream port, wherein the setting process includes an amplitude adjustment that adjusts an amplitude of a voltage output waveform at the downstream port;
   a determination unit configured to determine whether or not the setting process has been completed;
   a detection unit configured to, when the determination unit determines that the setting process has been completed, detect whether or not the USB device is in the connecting state; and
   an initialization unit configured to, when the detection unit detects the connecting state, execute initialization of the USB device.

2. The information processing apparatus according to claim 1, wherein
   the setting process unit sets, when the setting process has been completed, a flag indicating that the setting process has been completed, and
   the determination unit determines, based on the flag, that the setting process has been completed.

3. The information processing apparatus according to claim 1, the one or more controllers further configured to function as
   a notification unit configured to, when the detection unit detects the connecting state, notify the initialization unit of information indicating that the connection has been completed.

4. The information processing apparatus according to claim 3, wherein in a case where the USB device is not connected to the downstream port, the notification unit notifies the initialization unit of a detection result obtained by the detection unit without waiting for the determination made by the determination unit.

5. The information processing apparatus according to claim 1, wherein when the determination unit determines that the setting process has not been completed, the one or more controllers wait until the setting process is completed.

6. The information processing apparatus according to claim 1, further comprising the downstream port.

7. The information processing apparatus according to claim 1, further comprising a USB hub that has the downstream port.

8. The information processing apparatus according to claim 1, further comprising a power feeding device configured to feed power to the USB device connected to the downstream port.

9. The information processing apparatus according to claim 8, wherein the power feeding device feeds the power when the detection unit detects the connecting state.

10. The information processing apparatus according to claim 8, wherein the power feeding device stops feeding the power at startup of the information processing apparatus.

11. The information processing apparatus according to claim 1, wherein the setting process includes setting a vender ID.

12. The information processing apparatus according to claim 1, wherein the setting process includes setting a product ID.

13. The information processing apparatus according to claim 1, wherein the setting process includes setting an operating state.

14. The information processing apparatus according to claim 13, wherein the operating state includes one of a power saving mode and a test mode.

15. The information processing apparatus according to claim 13, wherein the operating state includes enabling or disabling the downstream port.

16. An information processing apparatus in which a USB device is capable of being removably connected to a downstream port, the information processing apparatus comprising:
   one or more controllers configured to function as:
   a setting process unit configured to, at startup of the information processing apparatus, start a setting process for making the USB device ready for use in a connecting state in which the USB device is connected to the downstream port, wherein the setting process includes an amplitude adjustment that adjusts an amplitude of a voltage output waveform at the downstream port;
   a power feeding unit configured to feed power to the downstream port;
   a determination unit configured to determine whether or not the setting process has been completed;
   a detection unit configured to, when the determination unit determines that the setting process has been completed, detect whether or not the USB device is in the connecting state; and
   an initialization unit configured to, when the detection unit detects the connecting state, execute initialization of the USB device,
   wherein the power feeding device stops feeding the power at startup of the information processing apparatus, and the power feeding device feeds the power when the determination unit determines that the setting process has been completed.

17. A control method for controlling an information processing apparatus in which a USB device is capable of being removably connected to a downstream port, the control method comprising:
   at startup of the information processing apparatus, starting a setting process for making the USB device ready for use in a connecting state in which the USB device is connected to the downstream port, wherein the setting process includes an amplitude adjustment that adjusts an amplitude of a voltage output waveform at the downstream port;
   determining whether or not the setting process has been completed;
   when it is determined that the setting process has been completed, detecting whether or not the USB device is in the connecting state; and
   when the connecting state is detected, executing initialization of the USB device.

18. A non-transitory storage medium storing a computer-executable program for causing a computer to execute a control method for controlling an information processing apparatus in which a USB device is capable of being removably connected to a downstream port,
   the control method comprising:
   at startup of the information processing apparatus, starting a setting process for making the USB device ready for use in a connecting state in which the USB device is connected to the downstream port, wherein the setting process includes an amplitude adjustment that adjusts an amplitude of a voltage output waveform at the downstream port;
   determining whether or not the setting process has been completed;
   when it is determined that the setting process has been completed, detecting whether or not the USB device is in the connecting state; and
   when the connecting state is detected, executing initialization of the USB device.

* * * * *